(12) United States Patent
Shimokawa

(10) Patent No.: US 9,683,522 B2
(45) Date of Patent: Jun. 20, 2017

(54) FUEL TANK SYSTEM AND METHOD FOR SENSING PERFORATION

(71) Applicant: TOYOTA JIDOSHA KABUSHIKI KAISHA, Toyota-shi, Aichi-ken (JP)

(72) Inventor: Shinji Shimokawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 14/865,645

(22) Filed: Sep. 25, 2015

(65) Prior Publication Data

US 2016/0146158 A1 May 26, 2016

(30) Foreign Application Priority Data

Nov. 21, 2014 (JP) ................. 2014-237077

(51) Int. Cl.
*F02M 25/08* (2006.01)
*B60K 15/035* (2006.01)
*B60K 15/03* (2006.01)

(52) U.S. Cl.
CPC ... *F02M 25/0809* (2013.01); *B60K 15/03504* (2013.01); *B60K 15/03519* (2013.01);
(Continued)

(58) Field of Classification Search
CPC ........... F02M 25/0809; F02M 25/0872; F02M 25/0854; F02M 25/0836; F02M 25/0818; F02D 41/0032; F02D 19/0663; F02D 19/0665; B60K 15/03504; B60K 15/01; B60K 15/03519; B60K 2015/0358; B60K 2015/03585
(Continued)

(56) References Cited

U.S. PATENT DOCUMENTS

2012/0186333 A1* 7/2012 Nishimura ......... F02M 25/0809
73/40.5 R
2014/0137964 A1* 5/2014 Aso ................... F02M 25/0836
137/587

(Continued)

FOREIGN PATENT DOCUMENTS

| JP | 2007-211601 A | 8/2007 |
| JP | 2013-144942 A | 7/2013 |
| JP | 2013-174184 A | 9/2013 |

*Primary Examiner* — Thomas Moulis
*Assistant Examiner* — George Jin
(74) *Attorney, Agent, or Firm* — Oliff PLC

(57) ABSTRACT

A fuel tank system includes: a fuel tank; a canister; a vent pipe; a valve member that is provided at the vent pipe and is sectioned into a tank-side main chamber, a canister-side main chamber and a back pressure chamber; a pipe configured to open an interior of the canister to the atmosphere; a negative pressure pump that is provided at the pipe, and applies negative pressure through the canister and the vent pipe to a fuel tank interior; a judging means for judging absence/presence of perforation of the fuel tank from behavior of air pressure at a time when negative pressure is generated at the negative pressure pump; and a negative pressure application path that communicates the pipe with the back pressure chamber, and that is configured to apply negative pressure from the negative pressure pump to the back pressure chamber without the negative pressure going through the canister.

2 Claims, 3 Drawing Sheets

(52) U.S. Cl.
CPC .... *F02M 25/0836* (2013.01); *F02M 25/0872* (2013.01); *B60K 2015/03276* (2013.01); *B60K 2015/03514* (2013.01); *F02M 25/0818* (2013.01)

(58) Field of Classification Search
USPC .......................... 123/516, 517, 518, 519, 520
See application file for complete search history.

(56) References Cited

U.S. PATENT DOCUMENTS

2015/0198103 A1* 7/2015 Dudar ................ F02M 25/0809
701/102
2015/0211952 A1* 7/2015 Yang ..................... G01M 3/025
73/40.5 R
2015/0285171 A1* 10/2015 Dudar ................ F02M 25/0836
73/114.39

* cited by examiner

FUEL TANK SYSTEM AND METHOD FOR SENSING PERFORATION

CROSS-REFERENCE TO RELATED APPLICATION

This application claims priority under 35 USC 119 from Japanese Patent Application No. 2014-237077 filed Nov. 21, 2014, the disclosure of which is incorporated by reference herein.

BACKGROUND

Technical Field

The technique of the present disclosure relates to a fuel tank system and a method for sensing perforation.

Related Art

A fuel tank system, in which a valve member (a diaphragm valve) is provided at a vent pipe that communicates a fuel tank with a canister, is known (see, for example, Japanese Patent Application Laid-Open (JP-A) No. 2013-144942). In this fuel tank system, at usual times, the valve member is closed and the fuel tank is sealed. On the other hand, at the time of carrying out sensing as to whether or not perforation has arisen at the fuel tank (hereinafter simply called "perforation sensing"), by applying negative pressure to a back pressure chamber of the valve member and opening the valve member, negative pressure of a pump for diagnosis is introduced into the fuel tank. Concretely, negative pressure from the pump for diagnosis is applied to the back pressure chamber by providing a canister-side bypass path that communicates the vent pipe, that is at the canister side, and the back pressure chamber of the valve member.

In such a fuel tank system, some time is required from the application of negative pressure by the pump for diagnosis until the valve member opens, and this time affects the time required for perforation sensing.

SUMMARY

An object of an embodiment of the present invention is to provide, in a structure in which a valve member is provided at a vent pipe that communicates a fuel tank with a canister, a fuel tank system and a perforation sensing method that can shorten the time needed for perforation sensing.

A fuel tank system relating to a first aspect of the present invention includes: a fuel tank that can accommodate fuel at an interior thereof; a canister that, by an adsorbent, adsorbs and desorbs evaporated fuel that is generated within the fuel tank; a vent pipe that communicates the fuel tank with the canister, and that is configured to send the evaporated fuel within the fuel tank to the canister; a valve member that is provided at the vent pipe and is sectioned into a tank-side main chamber, that communicates with the vent pipe that is at a fuel tank side, a canister-side main chamber that communicates with the vent pipe that is at a canister side, and a back pressure chamber that is disposed at a side of a valve member main body which is opposite a side at which the tank-side main chamber and the canister-side main chamber are disposed; a pipe configured to open an interior of the canister to the atmosphere; a negative pressure pump that is provided at the pipe for opening to the atmosphere, and applies negative pressure through the canister and the vent pipe to the fuel tank interior; a judging means for judging absence/presence of perforation of the fuel tank from behavior of air pressure at a time when negative pressure is generated at the negative pressure pump; and a negative pressure application path that communicates the pipe with the back pressure chamber, and that is configured to apply negative pressure from the negative pressure pump to the back pressure chamber without the negative pressure going through the canister.

In this fuel tank system, the fuel tank and the canister are communicated by the vent pipe, and the valve member is provided at the vent pipe. The fuel tank can be sealed due to the valve member being closed.

When negative pressure is generated at the negative pressure pump, negative pressure is introduced, through the canister and the vent pipe, into the canister-side main chamber of the valve member. Further, negative pressure is also introduced, through the negative pressure application path, into the back pressure chamber of the valve member.

On the other hand, tank internal pressure is introduced into the tank-side main chamber of the valve member. Therefore, the internal pressure at the main chamber (the tank-side main chamber and the canister-side main chamber) side becomes high with respect to the internal pressure of the back pressure chamber, and the valve member main body moves, and the valve member opens. When the valve member opens, the negative pressure of the negative pressure pump can be introduced, through the vent pipe, into the fuel tank.

The judging means judges the absence/presence of perforation of the fuel tank, from the air pressure behavior at the time when negative pressure is generated at the negative pressure pump as described above.

In this fuel tank system, negative pressure from the negative pressure pump is introduced into the back pressure chamber from the negative pressure application path, that communicates the pipe for opening to the atmosphere and the back pressure chamber, and without going through the canister. As compared with a structure in which negative pressure is introduced via the canister, the speed of the decrease in the internal pressure of the back pressure chamber becomes faster by an amount corresponding to lack of air passage resistance (pressure loss) that is due to the adsorbent of the canister. Accordingly, the time from the generating of negative pressure at the negative pressure pump to the opening of the valve member is shortened, and as a result, the time required for perforation sensing can be shortened.

A method for sensing perforation relating to a second aspect of the present invention includes, with respect to a fuel tank system having: a fuel tank that can accommodate fuel at an interior thereof; a canister that, by an adsorbent, adsorbs and desorbs evaporated fuel that is generated within the fuel tank; a vent pipe that communicates the fuel tank with the canister, and that is configured to send the evaporated fuel within the fuel tank to the canister; a valve member that is provided at the vent pipe and is sectioned into a tank-side main chamber, that communicates with the vent pipe that is at a fuel tank side, a canister-side main chamber, that communicates with the vent pipe that is at a canister side, and a back pressure chamber, that is disposed at a side of a valve member main body which is opposite a side at which the tank-side main chamber and the canister-side main chamber are disposed; a pipe configured to open an interior of the canister to the atmosphere; a negative pressure pump that is provided at the pipe for opening to the atmosphere, and applies negative pressure through the canister and the vent pipe to the fuel tank interior; and a negative pressure application path that communicates the pipe with the back pressure chamber, and that is configured to apply negative pressure from the negative pressure pump to the back pressure chamber without the negative pressure going through the canister, the method comprising: applying negative pressure through the negative pressure application path to the back pressure chamber by causing negative pressure to be generated at the negative pressure pump; and detecting behavior of air pressure at a time when the negative pressure is generated, and judging absence of presence of perforation of the fuel tank.

In this perforation sensing method, negative pressure is applied to the back pressure chamber due to negative pressure being generated at the negative pressure pump. Thereupon, the valve member that is provided at the vent pipe is opened, and the negative pressure from the negative pressure pump can be applied, through the canister and the vent pipe, to the fuel tank. Then, the behavior of the air pressure at the time of generating negative pressure is detected, and the absence/presence of perforation of the fuel tank is judged.

In this perforation sensing method as well, negative pressure from the negative pressure pump is introduced into the back pressure chamber from the negative pressure application path, that communicates the pipe for opening to the atmosphere and the back pressure chamber, and without going through the canister. As compared with a structure in which negative pressure is introduced via the canister, the speed of the decrease in the internal pressure of the back pressure chamber becomes faster by an amount corresponding to lack of air passage resistance (pressure loss) that is due to the adsorbent of the canister. Accordingly, the time from the generating of negative pressure at the negative pressure pump to the opening of the valve member is shortened, and as a result, the time required for perforation sensing can be shortened.

Because an embodiment of the present invention is as described above, the time required for perforation sensing can be shortened in a structure in which a valve member is provided at a vent pipe that communicates a fuel tank and a canister.

BRIEF DESCRIPTION OF THE DRAWINGS

Exemplary embodiments of the present invention will be described in detail based on the following figures, wherein.

DETAILED DESCRIPTION

Figure 1:
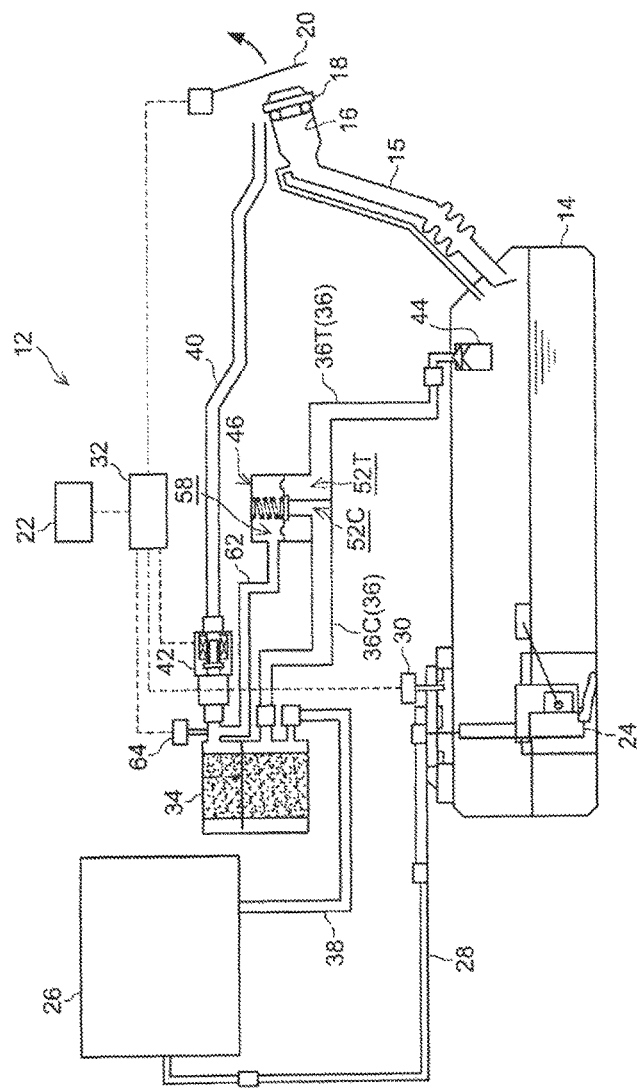
FIG. 1 is a schematic structural view showing the overall structure of a fuel tank system of a first embodiment.

A fuel tank system 12 of a first embodiment relating to the technique of the present disclosure is shown in FIG. 1.

The fuel tank system 12 has a fuel tank 14 that can accommodate fuel at the interior thereof. The lower portion of an inlet pipe 15 is connected to the upper portion of the fuel tank 14. The opening portion at the upper end of the inlet pipe 15 is a refueling port 16. A refueling gun is inserted into the refueling port 16, and the fuel tank 14 can be refueled. The refueling port 16 of the inlet pipe 15 is usually closed by a fuel cap 18, and, at times of refueling, the fuel cap 18 is removed by a refueling operator or the like.

A fuel lid 20 is provided at a panel of the vehicle body, further toward the outer side than the fuel cap 18. When information that a lid release switch 22, that is provided in the vehicle cabin or the like, has been operated is sent to a control device 32, the fuel lid 20 is opened by the control device 32 under predetermined conditions. The control device 32 is an example of the judging means relating to the technique of the present disclosure.

A fuel pump 24 is provided within the fuel tank 14. The fuel pump 24 and an engine 26 are connected by a fuel supply pipe 28. Due to the fuel pump 24 being driven, fuel within the fuel tank 14 can be sent through the fuel supply pipe 28 to the engine 26.

A tank internal pressure sensor 30 is provided at the fuel tank 14. Information of the tank internal pressure within the fuel tank 14, which information is sensed by the tank internal pressure sensor 30, is sent to the control device 32.

A canister 34 is provided at the exterior of the fuel tank 14. An adsorbent such as activated carbon or the like is accommodated within the canister 34. The vapor layer within the fuel tank 14 and the canister 34 are connected by a vent pipe 36, and vapor within the fuel tank 14 can be made to flow into the canister 34. The evaporated fuel within the vapor that flows-in is adsorbed by the adsorbent of the canister 34, and vapor other than that (the atmospheric air component) is discharged into the atmosphere from a pipe 40 for opening to the atmosphere.

A purge pipe 38 that communicates with the engine 26 is connected to the canister 34. Negative pressure that is generated at the time when the engine 26 operates is applied to the canister 34, and the evaporated fuel that has been adsorbed by the adsorbent within the canister 34 can be desorbed. The evaporated fuel (vapor) that was desorbed is sent to the engine 26 and burned. At this time, atmospheric air is introduced into the canister 34 through the pipe 40 for opening to the atmosphere.

A pump 42 for diagnosis is provided at the pipe 40 for opening to the atmosphere. The driving of the pump 42 for diagnosis is controlled by the control device 32. The pump 42 for diagnosis is used at the time of diagnosing trouble or the like with the fuel tank system 12, by applying a predetermined pressure from the canister 34 through the vent pipe 36 to the fuel tank. The pump 42 for diagnosis is an example of the negative pressure pump relating to the technique of the present disclosure.

A full-tank restricting valve 44 is provided at the end portion at the fuel tank side of the vent pipe 36 so as to be positioned at the upper portion of the fuel tank 14 interior.

A diaphragm valve 46 is provided at an intermediate portion (the portion between the fuel tank 14 and the canister 34) of the vent pipe 36. The diaphragm valve 46 is an example of the valve member relating to the technique of the present disclosure. Hereinafter, as needed, the portion of the vent pipe 36 that is further toward the fuel tank 14 side than this diaphragm valve 46 is called a tank-side vent pipe 36T, and the portion of the vent pipe 36 that is further toward the canister 34 side than the diaphragm valve 46 is called a canister-side vent pipe 36C.

Figure 2A:
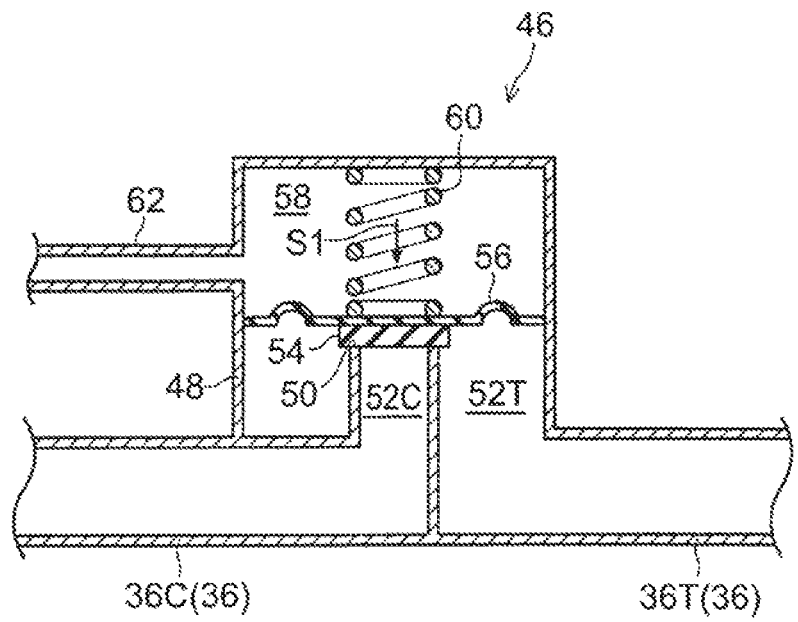
FIG. 2A is a cross-sectional view showing, partially and in an enlarged manner, the fuel tank system of the first embodiment in a state in which a diaphragm valve is closed.

As shown in detail in FIG. 2A, the diaphragm valve 46 has a valve housing 48 that is shaped as a cylindrical tube and is connected to the tank-side vent pipe 36T. One end side of the canister-side vent pipe 36C is housed at the interior of the valve housing 48. The one end side of the canister-side vent pipe 36C is bent so as to become coaxial with the valve housing 48, and this end portion is made to be a valve seat 50.

The opening portion of the valve seat 50 can be closed by a valve member main body 54. The valve member main body 54 is mounted to a diaphragm 56. The interior of the valve housing 48 is sectioned above and below by the diaphragm 56. Of the interior of the valve housing 48, the space that is further toward the upper side than the diaphragm 56 in FIG. 2A is made to be a back pressure chamber 58. On the other hand, the space that is further toward the lower side than the diaphragm 56 in FIG. 2A is made to be a main chamber 52. Moreover, of the main chamber 52, the portion that corresponds to the one end side of the canister-side vent pipe is made to be a canister-side main chamber 52C, and the other portion is made to be a tank-side main chamber 52T.

A compression coil spring 60 is housed in the back pressure chamber 58. The compression coil spring 60 applies elastic force in the direction heading toward the valve seat 50 (the arrow S1 direction) to the valve member main body 54. Moreover, the diaphragm 56 as well applies elastic force in the arrow S1 direction to the valve member main body 54. Due thereto, the valve member main body 54 is urged in the direction of closing the opening portion of the valve seat 50. The valve member main body 54 fits tightly to the valve seat 50 in a case in which, for example, the internal pressures of the canister side main chamber 52C, the tank-side main chamber 52T and the back pressure chamber 58 are all around the same. Due thereto, the opening portion of the valve seat 50 is closed, and movement (flowing-through) of vapor between the tank-side main chamber 52T and the canister-side main chamber 52C is inhibited. Namely, the diaphragm valve 46 enters into a closed state, and movement of vapor in the vent pipe 36 is inhibited.

In contrast, when, for example, the internal pressures of the back pressure chamber 58 and the canister-side main chamber 52C are negative pressures that are a predetermined value or more greater than the internal pressure of the tank-side main chamber 52 (i.e., the back pressure chamber 58 and the canister-side main chamber 52C are in states in which the internal pressures thereof are low), the valve member main body 54 moves toward the back pressure chamber 58 side against the elastic forces of the compression coil spring 60 and the diaphragm 56, and opens the opening portion of the valve seat 50. Due thereto, movement (flowing-through) of vapor between the tank-side main chamber 52T and the canister-side main chamber 52C becomes possible. Namely, the diaphragm valve 46 enters into an open state, and movement of vapor in the vent pipe 36 becomes possible.

A negative pressure application path 62 is provided at the pipe 40 for opening to the atmosphere so as to branch-off from the portion thereof between the pump 42 for diagnosis and the canister 34. Further, the negative pressure application path 62 communicates with the back pressure chamber 58. Negative pressure from the pump 42 for diagnosis can be applied through this negative pressure application path 62 to the back pressure chamber 58.

A pressure sensor 64 for diagnosis is provided at the pipe 40 for opening to the atmosphere at the portion thereof between the pump 42 for diagnosis and the canister 34. The pressure sensor 64 for diagnosis detects pressure P of this portion, and sends that information to the control device 32. On the basis of the change in the pressure P after the pump 42 for diagnosis is operated, the control device 32 judges whether or not there is perforation of the fuel tank 14.

Operation of the fuel tank system 12 of the present embodiment is described next.

In the fuel tank system 12 of the present embodiment, perforation sensing of the fuel tank 14 can be carried out as described hereinafter.

When the control device 32 operates the pump 42 for diagnosis, negative pressure is introduced through the negative pressure application path 62 into the back pressure chamber 58. Further, negative pressure is introduced into the canister-side main chamber 52C as well, through the canister 34 and the canister-side vent pipe 36C. Namely, negative pressure from the pump 42 for diagnosis is introduced into both the back pressure chamber 58 and the canister-side main chamber 52C.

Figure 2B:
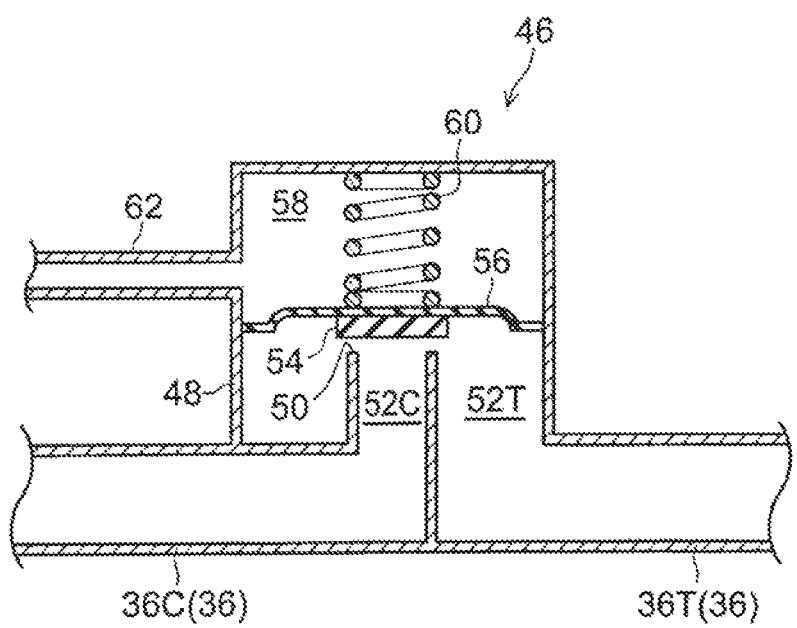
FIG. 2B is a cross-sectional view showing, partially and in an enlarged manner, a state in which the diaphragm valve is open.

At this time, tank internal pressure is introduced through the tank-side vent pipe 36T into the tank-side main chamber 52T. Therefore, of the pressure that is applied to the diaphragm 56 and the valve member main body 54, the pressure from the main chamber side becomes higher by an amount corresponding to the tank internal pressure that is introduced into the tank-side main chamber 52T. When the pressure from the main chamber side becomes higher, as shown in FIG. 2B, the diaphragm 56 and the valve member main body 54 move, and the diaphragm valve 46 opens. Due thereto, negative pressure from the pump 42 for diagnosis can be introduced through the vent pipe 36 into the fuel tank 14.

Figure 3:
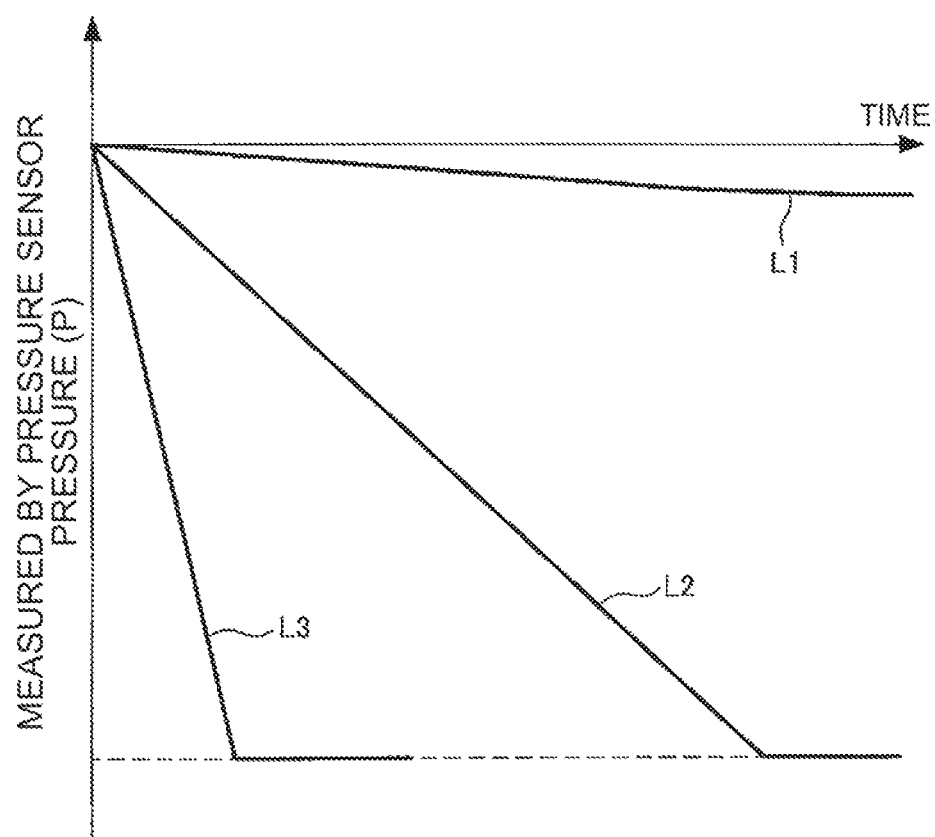
FIG. 3 is a graph showing, in the fuel tank system of the first embodiment, changes over time in pressure measured by a pressure sensor for diagnosis, after a pump for diagnosis has been operated.

Here, in a case in which there is no perforation of the fuel tank 14, the pressure P that is measured by the pressure sensor 64 for diagnosis decreases over time and reaches (falls to) a predetermined pressure, as shown by solid line L2 of FIG. 3. In contrast, in a case in which there is perforation of the fuel tank 14, the pressure P that is measured by the pressure sensor 64 for diagnosis is as solid line L1 of FIG. 3. Namely, even if negative pressure is applied to the fuel tank 14, vapor is introduced into the fuel tank 14 from the hole that has opened-up, and the pressure P does not reach (fall to) the predetermined pressure.

Accordingly, if the relationship between time and the pressure that is measured by the pressure sensor 64 for diagnosis is a relationship such as the solid line L2 of FIG. 3, it can be judged that there is no perforation of the fuel tank 14. On the other hand, if the relationship between time and the pressure that is measured by the pressure sensor 64 for diagnosis is a relationship such as the solid line L1 of FIG. 3, it can be judged that there is perforation of the fuel tank 14.

As described above, basically, perforation sensing is carried out by operating the pump 42 for diagnosis and opening the diaphragm valve 46 and applying negative pressure to the fuel tank 14.

However, in a case in which the tank internal pressure is very low (e.g., is 2 KPa or more lower than atmospheric pressure), the diaphragm valve 46 does not open due to the relationship with the performance of the pump 42 for diagnosis. Namely, when the pump 42 for diagnosis is operated, negative pressure from the pump 42 for diagnosis is introduced into both the back pressure chamber 58 and the canister-side main chamber 52C. However, because the tank internal pressure that is a very low pressure is being introduced into the tank-side main chamber, the internal pressure of the main chamber 52 does not become high, to the extent that the diaphragm valve 46 opens, with respect to the internal pressure of the back pressure chamber 58, and the diaphragm valve 46 does not open.

In this case, the relationship between time and the pressure measured by the pressure sensor 64 for diagnosis becomes a relationship such as solid line L3 of FIG. 3.

Namely, because the diaphragm valve 46 is not opened, the volume of the space into which the negative pressure of the pump 42 for diagnosis is introduced becomes small (concretely, becomes small by an amount corresponding to the volume of the vapor layer at the tank-side vent pipe 36 and the fuel tank 14). Therefore, the pressure that is measured by the pressure sensor 64 for diagnosis falls rapidly over time, and reaches (falls to) the predetermined pressure earlier than the solid line L2 (refer to the solid line L3 of FIG. 3).

By the way, even if there was perforation of the fuel tank 14, atmospheric pressure would be introduced into the fuel tank 14 from that hole, and therefore, the tank negative pressure would become lower, by 2 KPa or more, than atmospheric pressure. Accordingly, if the relationship between time and the pressure measured by the sensor 64 for pressure diagnosis is a relationship such as the solid line L3 of FIG. 3, it can be judged that there is no perforation of the fuel tank 14.

A fuel tank system of a comparative example is considered next. In a fuel tank system of a comparative example, the negative pressure application path 62 is not provided, and instead, a canister-side bypass path that communicates the canister-side vent pipe 36C and the back pressure chamber 58 is provided. In the fuel tank system of the comparative example as well, when the pump 42 for diagnosis is operated, negative pressure is introduced into the canister-side main chamber 52C via the canister 34 and the canister-side vent pipe 36C. Further, negative pressure is introduced also into the back pressure chamber 58 via the canister 34, the canister-side vent pipe 36C and the canister-side bypass path. Due thereto, the diaphragm valve 46 opens and negative pressure can be applied to the fuel tank 14, except for cases in which the tank internal pressure is very low.

At this time, in the fuel tank system of the comparative example, at the time when negative pressure is introduced into the back pressure chamber 58, the negative pressure is introduced via the canister 34, and therefore, is subjected to air passage resistance due to the adsorbent that is within the canister 34.

In contrast, in the fuel tank system 12 of the present embodiment, because the negative pressure application path 62 is provided, negative pressure can be introduced into the back pressure chamber 58 without going through the canister 34. Namely, negative pressure can be introduced without being subjected to air passage resistance (pressure loss) due to the adsorbent of the canister 34. As a result, as compared with the fuel tank system of the comparative example, the timing at which the diaphragm valve 46 opens can be made to be earlier, and negative pressure can be applied to the fuel tank 14 at an earlier stage. Accordingly, in the fuel tank system 12 of the present embodiment, the time required for perforation sensing can be shortened.

In the above-described embodiment, as the diaphragm valve 46, an example is given in which the diameter of the tank-side vent pipe 36T is enlarged and the valve housing 48 is structured, and, on the other hand, the canister-side vent pipe 36C is accommodated in the valve housing 48, and the end portion of the canister-side vent pipe 36C is made to be the valve seat 50. However, the diaphragm valve 46 is not limited to this, and the structures of the canister-side vent pipe 36C and the tank-side vent pipe 36T may be the opposite.

Further, in the above-described embodiment, an example is given in which changes in air pressure are measured and perforation is sensed by the pressure sensor 64 for diagnosis that is provided at the portion between the pump 42 for diagnosis and the canister 34. However, the pressure sensor that is used in perforation sensing is not limited to this, and perforation sensing can be carried out by using the tank internal pressure sensor 30. Note that, in this case, if it can be confirmed by the tank internal pressure sensor 30 that that the interior of the fuel tank 14 is a negative pressure that is less than or equal to a predetermined value, it can be judged, without operating the pump 42 for diagnosis, that there is no perforation.

In the above-description, the diaphragm valve 46 is given as an example of the valve member relating to the technique of the present disclosure, but the valve member is not limited to the diaphragm valve 46. For example, there may be a structure in which the diaphragm 56 is eliminated, and the diameter of the valve member main body 54 is increased such that the outer periphery of the valve member main body 54 contacts the inner periphery of the valve housing 48. In this structure, the valve member main body 54 alone sections the main chamber 52 and the back pressure chamber 58, and moves to the position of closing the vent pipe 36 by contacting the valve seat 50, and moves to the position of opening the vent pipe 36 by moving apart from the valve seat 50.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A fuel tank system comprising:
   a fuel tank that can accommodate fuel at an interior thereof;
   a canister that, by an adsorbent, adsorbs and desorbs evaporated fuel that is generated within the fuel tank;
   a vent pipe that communicates the fuel tank with the canister, and that is configured to send the evaporated fuel within the fuel tank to the canister;
   a valve member that is provided at the vent pipe and is sectioned into a tank-side main chamber, that communicates with the vent pipe that is at a fuel tank side, a canister-side main chamber that communicates with the vent pipe that is at a canister side, and a back pressure chamber that is disposed at a side of a valve member main body which is opposite a side at which the tank-side main chamber and the canister-side main chamber are disposed;
   a pipe configured to open an interior of the canister to the atmosphere;
   a negative pressure pump that is provided at the pipe for opening to the atmosphere, and applies negative pressure through the canister and the vent pipe to the fuel tank interior;
   a judging means for judging absence/presence of perforation of the fuel tank from behavior of air pressure at a time when negative pressure is generated at the negative pressure pump; and
   a negative pressure application path that communicates the pipe with the back pressure chamber, and that is configured to apply negative pressure from the negative pressure pump to the back pressure chamber without the negative pressure going through the canister.

2. A method for sensing perforation comprising, with respect to a fuel tank system having:
   a fuel tank that can accommodate fuel at an interior thereof;

a canister that, by an adsorbent, adsorbs and desorbs evaporated fuel that is generated within the fuel tank;

a vent pipe that communicates the fuel tank with the canister, and that is configured to send the evaporated fuel within the fuel tank to the canister;

a valve member that is provided at the vent pipe and is sectioned into a tank-side main chamber, that communicates with the vent pipe that is at a fuel tank side, a canister-side main chamber, that communicates with the vent pipe that is at a canister side, and a back pressure chamber, that is disposed at a side of a valve member main body which is opposite a side at which the tank-side main chamber and the canister-side main chamber are disposed;

a pipe configured to open an interior of the canister to the atmosphere;

a negative pressure pump that is provided at the pipe for opening to the atmosphere, and applies negative pressure through the canister and the vent pipe to the fuel tank interior; and a negative pressure application path that communicates the pipe with the back pressure chamber, and that is configured to apply negative pressure from the negative pressure pump to the back pressure chamber without the negative pressure going through the canister, the method comprising:

applying negative pressure through the negative pressure application path to the back pressure chamber by causing negative pressure to be generated at the negative pressure pump; and detecting behavior of air pressure at a time when the negative pressure is generated, and judging absence of presence of perforation of the fuel tank.

* * * * *